United States Patent [19]

Sekiguchi et al.

[11] Patent Number: 4,520,410
[45] Date of Patent: May 28, 1985

[54] SCAN TRACKING APPARATUS FOR HELICAL SCAN VIDEO TAPE RECORDER

[75] Inventors: Toru Sekiguchi; Isao Sanguu, both of Tokyo, Japan

[73] Assignee: Nippon Electric Co., Ltd., Tokyo, Japan

[21] Appl. No.: 470,667

[22] Filed: Feb. 28, 1983

[30] Foreign Application Priority Data

Feb. 26, 1982 [JP] Japan .................................. 57-30314

[51] Int. Cl.³ .............................................. G11B 5/58
[52] U.S. Cl. ...................................... 360/77; 360/10.2; 360/70
[58] Field of Search ......................... 360/10.2, 70, 77

[56] References Cited

U.S. PATENT DOCUMENTS

| | | | |
|---|---|---|---|
| 4,148,083 | 4/1979 | Watanabe | 360/77 |
| 4,433,350 | 2/1984 | Tsuruta | 360/70 |
| 4,443,823 | 4/1984 | Sakamoto | 360/77 |

FOREIGN PATENT DOCUMENTS 2068599 8/1981 United Kingdom ................ 360/77

*Primary Examiner*—George G. Stellar
*Attorney, Agent, or Firm*—Sughrue, Mion, Zinn, Macpeak & Seas

[57] ABSTRACT

A scan tracking apparatus for a helical scan tape recorder, comprising a movable tape head (11), a detector (13) detecting the envelope of the tape signal to produce a reproduced signal, sampling means (15) for sampling the reproduced signal at fixed points of the helical scan, memory (17) for storing the reproduced signal and correction signals from different tracks of the helical scan, computation means (2) for computing a correction signal to return the tape head to the center of the track, a sawtooth generator (2, 4) for producing a signal related to the tape speed (v), and a head driving mechanism (9) for moving the tape head in response to the sawtooth and correction signals.

3 Claims, 7 Drawing Figures

| TRACK NO. | AVERAGE REPRODUCED SIGNAL MAGNITUDE | | | HEAD DEFLECTION DIRECTION | | |
|---|---|---|---|---|---|---|
| N-2 | $B_{21}$ | $B_{22}$ | $B_{23}$ | $D_{21}$ | $D_{22}$ | $D_{23}$ |
| N-1 | $B_{11}$ | $B_{12}$ | $B_{13}$ | $D_{11}$ | $D_{12}$ | $D_{13}$ |
| N | $B_{01}$ | $B_{02}$ | $B_{03}$ | $D_{01}$ | $D_{02}$ | $D_{03}$ |

SCAN TRACKING APPARATUS FOR HELICAL SCAN VIDEO TAPE RECORDER

BACKGROUND OF THE INVENTION

This invention relates to a helical scan video tape recorder (VTR), and more particularly to a scan tracking apparatus in which a video reproducing head is deflected to track a video track on a magnetic tape when such VTR produces a still, slow-motion or quick-motion image.

In the special reproduction such as the still image, the slow-motion image and the quick-motion image by using the helical scan VTR, the video reproducing head is deflected vertically along a sawtooth waveform. In this case, it is necessary that the video reproducing head should be controlled to track the center of the video track. Such technique for tracking the video track is disclosed in U.S. Pat. No. 4,151,570. The disclosed technique employs a feed back servo system, in which the video reproducing head is vibrated by an output of a dither oscillator, a frequency modulated RF signal derived from the head is subjected to envelope detection, the resultant output is further subjected to synchronous detection with the output of the dither oscillator, and the synchronous detected output is fed back to the video reproducing head through a head drive amplifier. However, this technique requires the dither oscillator and the servo system which means that the construction of the apparatus is complicated, and a complicated operation is required for regulating the servo system.

SUMMARY OF THE INVENTION

Therefore, it is an object of the present invention to provide a scan tracking apparatus for a helical scan video tape recorder, in which a video reproducing head can track a video track on a magnetic tape without a dither oscillator and a servo system.

According to the present invention, there is provided a scan tracking apparatus for helical scan video tape recorder including a video reproducing head mounted on a rotary drum, comprising means responsive to a tape transfer speed for generating a first control signal of a sawtooth shape, means for detecting an amplitude of a RF signal delivered from the video reproducing head, memory means for storing the detected amplitude of at least one video track, means for comparing the detected amplitudes corresponding to two adjacent scanned video tracks, means responsive to the result of the comparing means for generating a second control signal which deflects the video reproducing head by a predetermined small width, and means for deflecting the video reproducing head response to the mixed signal of the first and second control signals so as to track the video track accurately.

DESCRIPTION OF THE PREFERRED EMBODIMENT

Figure 1:
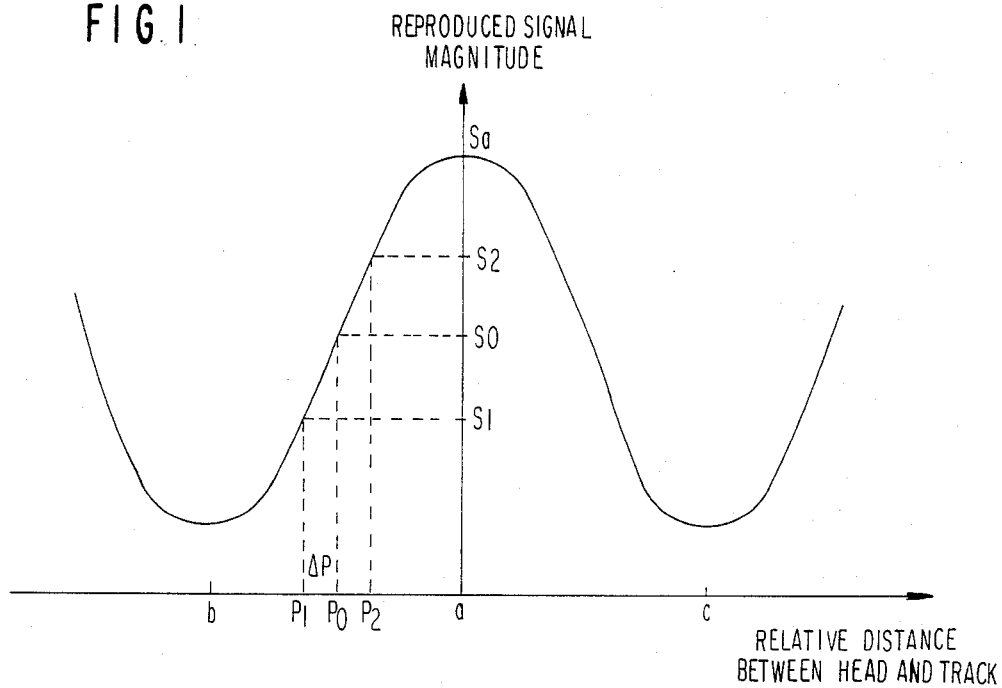
FIG. 1 schematically shows a reproduced signal amplitude delivered from a video reproducing head in response to a relative distance between the video reproducing head and a video track.

The present invention will now be described in detail with reference to the drawings. First, referring to FIG. 1, when the video reproducing head is in the center of a video track, i.e., it corresponds to the position a, the reproduced signal magnitude is at its maximum as shown in the chart. When the reproducing head is moved away from the center of the video track, the magnitude of the reproduced signal gradually decreases as shown in the sections between a and b, and between a and c. The reproducing head is moved to the position which is separated from the center of the video track by the distance equal to ½ of the width of the video track (including a guard band), i.e., position b or position c. When the reproducing head is moved further away from the position b or c, the signal recorded in the adjacent video track is reproduced and the reproduced signal magnitude is increasing again.

If the video reproducing head is at a position $P_0$ of the video track, the reproduced signal magnitude $S_0$ is obtained. When the video reproducing head is then moved intentionally toward the position b by a distance $\Delta P$, i.e., to a position $P_1$, the reproduced signal magnitude decreases from $S_0$ to $S_1$. Conversely, when the video reproducing head is moved from the position $P_0$ to a position $P_2$, the reproduced signal magnitude increases from $S_0$ to $S_2$. When the video reproducing head is moved by an extremely small distance from the position a, where tracking is being completed properly, the magnitude of the reproduced decreases irrespective of the direction of the movement of the reproducing head. Conversely, when the video reproducing head is moved by an extremely small distance from the position b or c, where the video reproducing head is farthest away from the video track, the magnitude of the reproduced signal is increased irrespective of the move direction of the video reproducing head.

Generally, when the video reproducing head is moved by an extremely small distance, the direction of the video track center can be determined with reference to the move direction of the video reproducing head and the result whether the magnitude of the reproduced signal is increased or decreased. However, when a tracking control operation is started from the position b or c, the direction to the central position a of the video track cannot be determined easily in some cases. This can be ascribed to the fact that, whichever side of the video track the video reproducing head moves vertically, the magnitude of the reproduced signal increases. Even in such case, the center of the video track may be determined if the estimation range is widened from the position a to the center of the adjacent video track. However, even if the center of a video track is tracked perfectly by the video reproducing head, the magnitude $S_a$ of the reproduced signal frequently varies due to variations in the friction between the magnetic tape and the video reproducing head, variation in the tape tension, and variation in the frequency of recorded signal. Namely, since the magnitude of the reproduced signal varies even due to causes other than the variation in the relative position between the video track and video reproducing head, it is sometimes difficult to keep the video reproducing head at the center of the video track, i.e. to maintain the accurate tracking operation based only on whether the reproduced signal increases or decreases when the video reproducing head is deflected by an extremely small distance.

Figure 2:
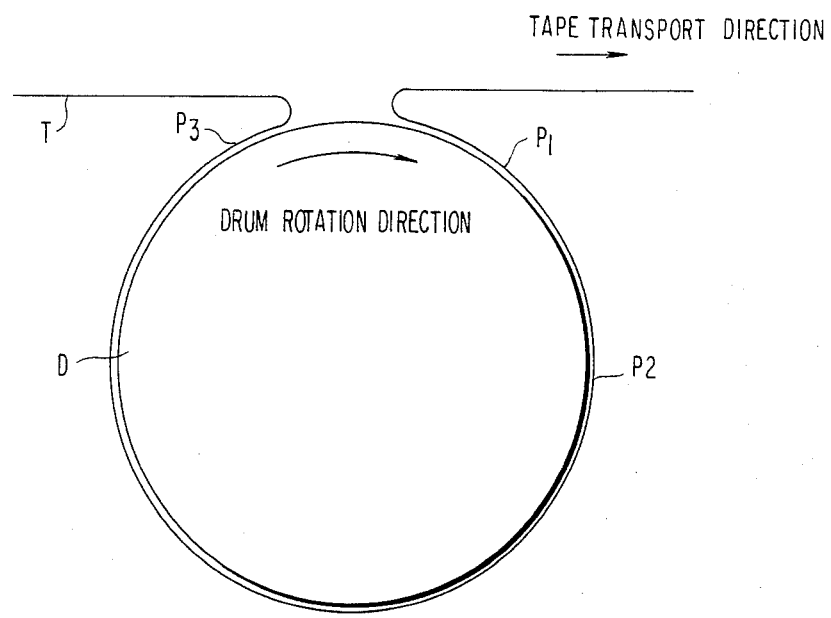
FIG. 2 shows one example of an arrangement of a rotary drum and a magnetic tape in a helical scan VTR.
Figure 3:
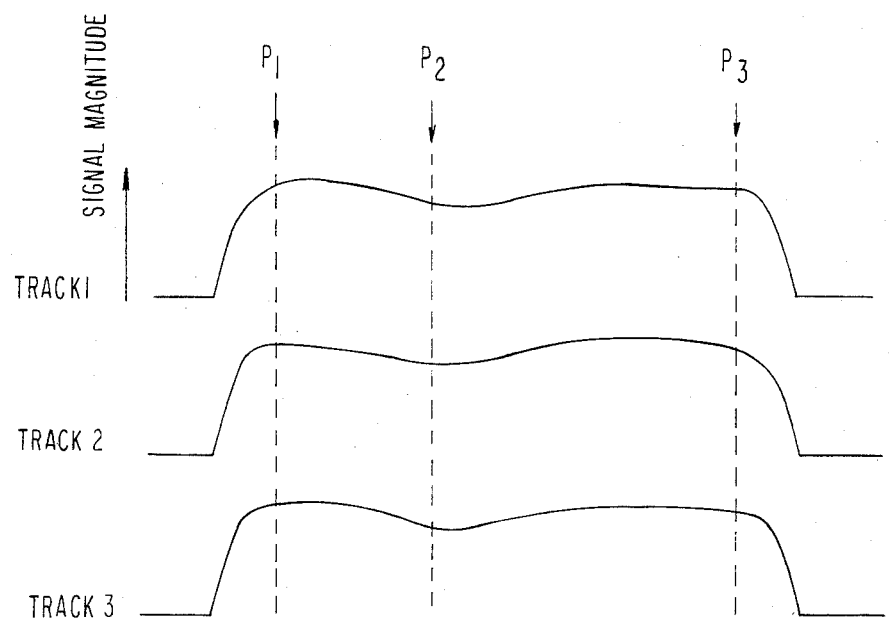
FIG. 3 is a chart showing the reproduced signal amplitudes derived from three video tracks, where the three reproduced signal have a stable co-relationship.

As previously mentioned, even when the tracking operation is conducted correctly, the magnitude of the reproduced signal does not stay constant because of various kinds of disturbances. However, the magnitudes of the reproduced signal at the same position in several successive video tracks are substantially the same. This has been proved by experiment and will be explained with reference to FIGS. 2 and 3. Referring to FIG. 2, a magnetic tape T is wound around a rotary drum D, and a video reproducing head is mounted on the rotary drum D and rotated therewith in the direction of the arrow so that it scans the video track on the magnetic tape T. The magnetic tape T is moved in the direction of the corresponding arrow in the drawing to reproduce the frequency modulated RF signal corresponding to one track for each rotation of the video reproducing head. Typical envelopes of the magnitudes of the reproduced signals are shown in FIG. 3. In FIG. 3, the magnitudes of the signal envelopes at, for example, position $P_1$, $P_2$ and $P_3$ are not equal. However, the magnitudes of, for example, the reproduced signals at the position $P_2$ in the different three video tracks are substantially the same. Namely, it can be seen that the changes of the signal magnitudes corresponding to the same points on successive video tracks are correlated. Accordingly, it is possible to maintain accurate tracking under the directional control of the video head deflection which is determined responsive to an increasing or decreasing magnitude shift between two previous scans of the video tracks, and the head deflection direction at the last scan. In the scan tracking apparatus for the helical scan VTR according to the present invention, the head deflection direction is controlled by using the correlation between reproduced signals corresponding to the successive video tracks. By the present invention, erroneous tracking operation derived from the prior art can be eliminated.

Figures 4, 6:
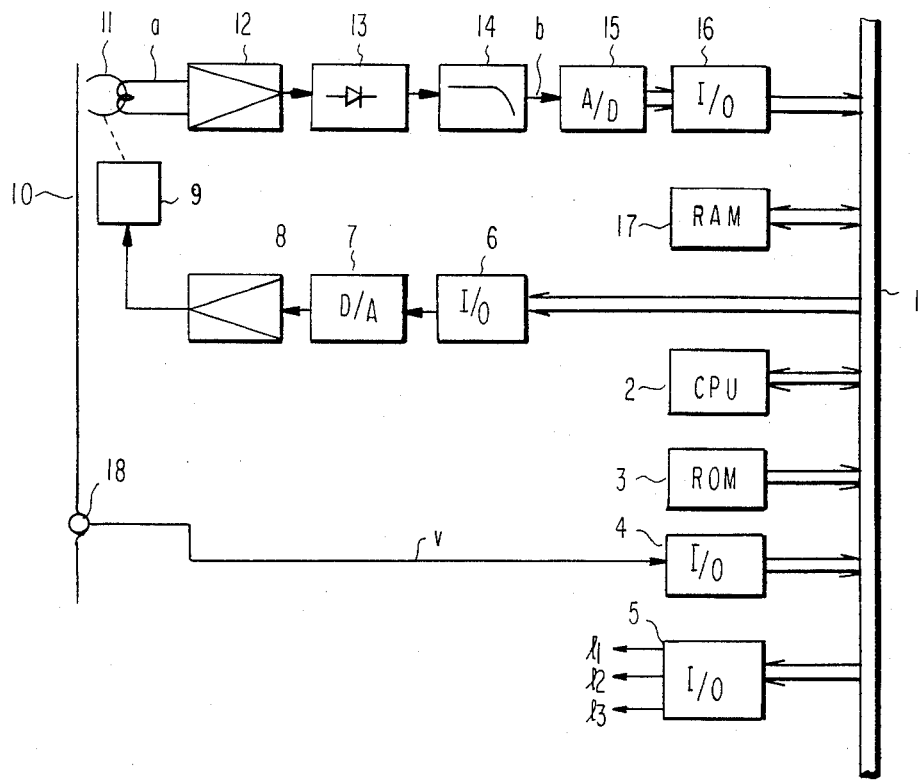
FIG. 4 illustrates an embodiment of the present invention.
FIG. 6 is a table describing the operation of the present invention.

FIG. 4 shows an embodiment of the present invention, in particular a control section thereof, for performing scan tracking operation. In this control section, a central processing unit (CPU) 2 executing the control program, a read-only memory (ROM) 3 in which the control program is stored, an interface (I/O) 4 receiving a speed signal v sent from a tape-speed detection means such as a timer roller 18, and an I/O port 5 outputting a one-track jump signal $l_1$, a two-track jump signal $l_2$, or a skip jump signal $l_3$ are connected to a bus 1. A signal c controlling the deflection of a video reproducing head 11 is sent from the bus 1 to a video reproducing head driving mechanism 9 including a piezoelectric element via an I/O port 6, a D/A digital-to-analog (D/A) converter 7 and an amplifier 8 in order to deflect the video reproducing head perpendicularly with respect to a video track on a magnetic tape.

Only the parts of the embodiment which relate to the present invention will be described. An RF frequency modulated signal a delivered from the rotating video reproducing head 11 is amplified by an amplifier 12 and rectified by a detector 13. The resultant signal is output from the detector 13 as an envelope signal (which will be hereinafter called the "reproduced signal b") of the reproduced RF signal a. The reproduced signal b then goes through a low-pass filter 14, in which undesirable high frequency components are removed, and the resultant reproduced signal b is converted into a digital signal by an analog-to-digital (A/D) converter 15. This digital signal delivered from the A/D converter 15 is input to the bus 1 through an I/O port 6.

In the A/D converter 15, the reproduced signal b is sampled at a sampling frequency of 15,750 Hz synchronized with the horizontal sync signal and converted into 8 bit parallel data. Since the magnitude of the RF signal delivered from the video reproducing head (a frequency modulated signal) is varied in response to the video signal level in practice, the horizontal blanking period having a constant level is sampled in the A/D converter 15. The data from the A/D converter 15 is supplied to the bus 1 through the I/O port 16. However, the access of the data to the bus 1 is not carried out synchronously with the sampling timing, but the access is carried out thirty four times per one field, i.e. per track. A video reproducing head deflection control signal c is produced on the basis of the data supplied to the bus 1.

Figure 5:
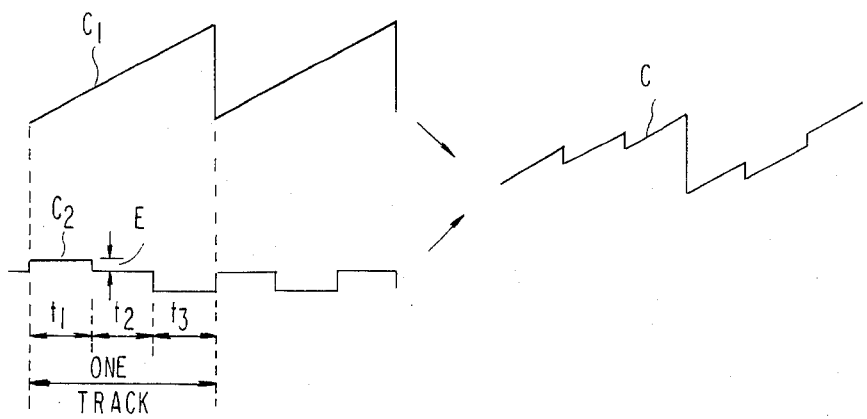
FIG. 5 is a graph showing that a video reproducing head driving control signal C consists of two control signals $C_1$ and $C_2$.

The video reproducing head deflection control signal c will now be described with reference to FIG. 5. As shown in FIG. 5, the deflection control signal c produced according to the present invention is considered to be composed of two signals, a sawtooth shape signal $c_1$ which is produced in accordance with the tape speed and which deflects the video reproducing head, and a stair-like control signal (follow-up control signal) $c_2$, which is determined on the basis of the increase or decrease in the magnitude of the RF signal from the tracks previously scanned by the video reproducing head and the deflection direction of the reproducing head during the scanning operation. The description of the sawtooth wave $c_1$, which is already known, will be omitted. The control signal $c_2$ deflects the video reproducing head upward or downward perpendicularly to the video track by a predetermined very small amount. In this embodiment, one video track (one field) is divided into three segments $t_1$, $t_2$ and $t_3$ as shown in FIG. 5, and the control signal $c_2$ is produced in each segment by utilizing the correlation between the video tracks previously being scanned. In the table of FIG. 6, the video tracks scanned by the video reproducing head are represented by N-2, N-1, and N according to a time base, and an average reproduced signal magnitude $B_{ij}$, which will be described in detail later, obtained in each segment is determined as shown in the table. The corresponding deflection direction $D_{ij}$ (upward or downward), in which the reproducing head is deflected, is also determined as shown in the table. When the video track N-1 is scanned by the reproducing head, the average reproduced signal magnitudes $B_{21}$, $B_{22}$ and $B_{23}$ obtained during the scanning of the previous video track N-2 are already stored in a memory (RAM) 17.

While the previous video track N-2 is being scanned, the deflection directions $D_{11}$, $D_{12}$ and $D_{13}$ for the video track N-1 are determined by comparing the average reproduced signals of the video track N-2 with the corresponding signals $B_{3j}$ of previous video track N-3, that have already been stored in a buffer memory (not shown). Similarly, during the scanning of the track N-1, the deflection direction for the scanning of the video track N are determined. The average reproduced signal magnitude $B_{21}$ corresponding to the video track N-2 and the average magnitude $B_{11}$ corresponding to the video track N-1 are compared in the first segment $t_1$. When $B_{11} \geq B_{21}$, the deflection direction $D_{01}$ for the first segment of the next track N is determined to be the same as the deflection direction $D_{11}$ used for the scanning of the track N-1. Conversely, when $B_{11} < B_{21}$, the deflection direction $D_{01}$ is set in the direction opposite to the direction $D_{11}$. Similarly, in the second segment $t_2$, the magnitudes $B_{22}$ and $B_{12}$ are compared. When $B_{12} \geq B_{22}$, the direction $D_{02}$ is set to conform to the direction $D_{12}$. When $B_{12} \geq B_{22}$, the direction $D_{02}$ is set in the direction opposite to the direction $D_{12}$. Similarly also, in the third segment $t_3$, the direction $D_{03}$ is set to conform to the direction $D_{13}$ when $B_{13} \geq B_{23}$, and in the direction opposite to the direction $D_{13}$ when $B_{13} < B_{23}$. In this embodiment, one shift level E of the follow-up control signal $c_2$ is set to be 1/16 of a level which makes the video reproducing head jump by one track. The level E is also a level capable of varying the magnitude of the reproduced RF signal by 0.5-1.0 dB. In the initial stage of the operation of a VTR, the average reproduced signal magnitude can not be obtained from a previously-scanned track. Therefore, a signal deflecting the video reproducing head in a certain direction is produced as the follow-up control signal $c_2$ by subjecting the level E to addition or subtraction.

If the levels of the follow-up control signal $c_2$ for the segments $t_1$, $t_2$ and $t_3$ are assumed to be levels $M_{11}$, $M_{12}$ and $M_{13}$ in the track N-1, and to be levels $M_{01}$, $M_{02}$ and $M_{03}$ in the track N (as counted on this revolution of the drum D), respectively, then when the reproducing head deflection direction $D_{01}$ is "1" indicating that the reproducing head is to be deflected upward, the control signal level is produced by the computation $M_{01} = M_{11} + E$. However, when the reproducing head deflection direction $D_{01}$ is "0" indicating that the reproducing head is to be deflected downward, the control signal level is produced by the computation $M_{01} = M_{11} - E$. The levels $M_{02}$ and $M_{03}$ of the segments $t_2$ and $t_3$ are also produced in the same manner, i.e., by the computations $M_{02} = M_{12} \pm E$ and $M_{03} = M_{13} \pm E$. These follow-up signal levels $c_2$ are added to the signal $c_1$ of the sawtooth wave, and the resultant signal c is sent to the A/D converter 7.

Figure 7:
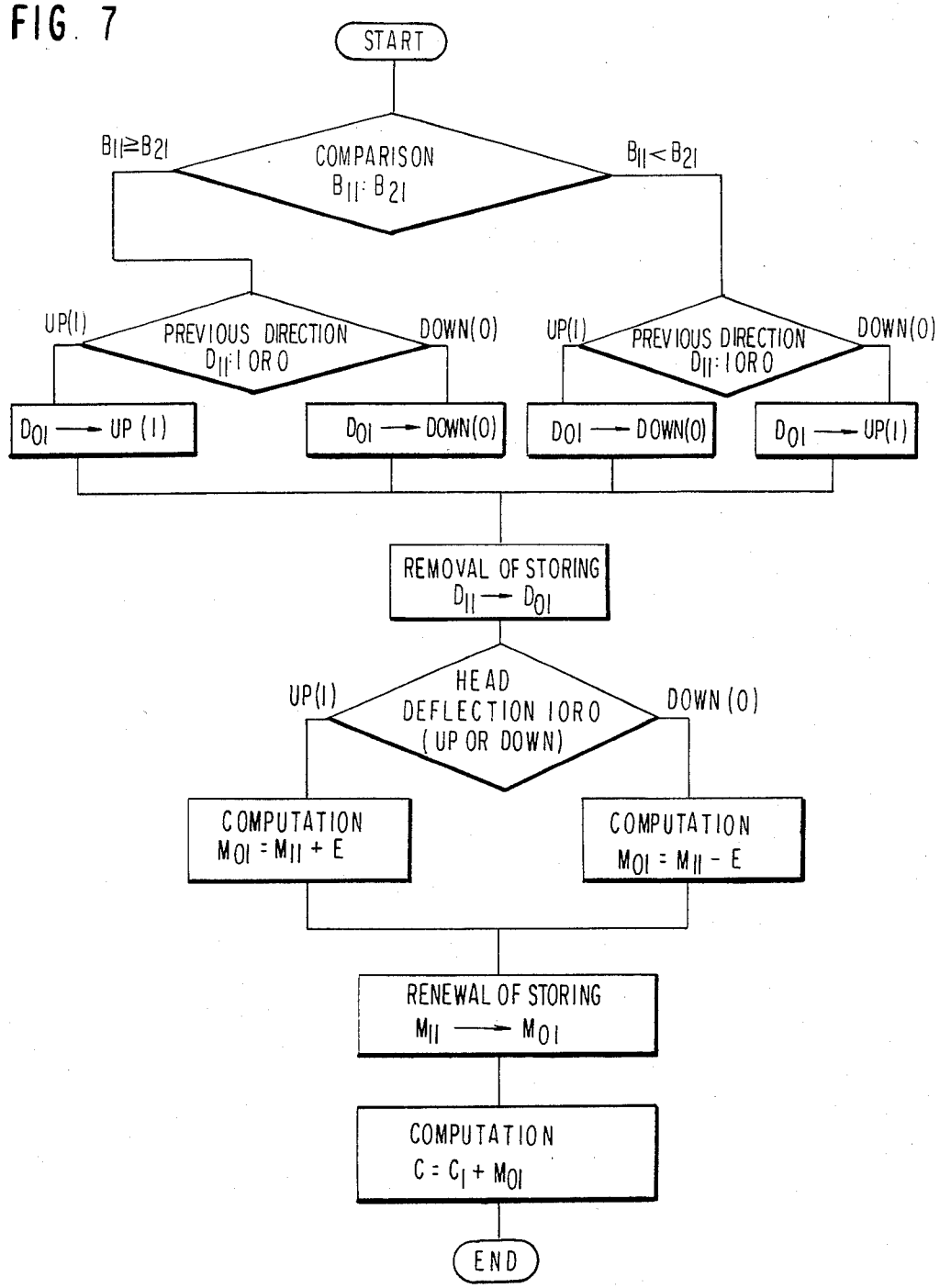
FIG. 7 is a flow chart describing the operation of the present invention.

FIG. 7 is a flow chart of the process for producing the aforementioned control signal c. The flow chart shows the process for producing the control signal for the first segment $t_1$ of the video track, and is also applicable to producing similar signals for the segments $t_2$ and $t_3$. The sawtooth-shaped control signal $c_1$ is formed by carrying out the computations, for example, 34 times for one track in respect to the speed detection signal v, and, therefore, the control signal c is also producing by carrying out the computations 34 times. During the computation, the level $M_{01}$ is added when the video reproducing head scans the segments $t_1$ in the video track, and the levels $M_{02}$ and $M_{03}$ are added when the reproducing head scans the segments $t_2$ and $t_3$ thereof, respectively to produce the deflection control signal c.

The calculation for seeking the average reproduced signal magnitude B in each segment on the video track will now be described. As previously mentioned, the I/O port 16 receives the reproduced signal data 34 times for each track. This means that each of the three segments contains eleven data at about 0.5 ms sample periods. In this embodiment, the average reproduced signal magnitude B is determined by averaging the eight data located in the center part of the eleven data. In this embodiment, the disadvantageous influence derived from dropout is eliminated by averaging eight data. In order to calculate the average reproduced signal magnitude B, the eight data are serially added and the added data are stored in to the same area in the RAM 17. After eight additions, the total added data stored in the area is divided by 8, and the average reproduced signal magnitude B are left in the area. Accordingly, the RAM 17 must have three memory areas. In order to store the directions D, three 1-bit buffer memories can be used. Further, it is possible to store the directions D into the RAM 17 if it has additional capacity.

What is claimed is:

1. A scan tracking apparatus for a helical scan video tape recorder comprising:
   head means for scanning video tracks on a magnetic tape to produce a reproduced signal;
   means responsive to a tape for producing a first control signal having a sawtooth shape;
   means responsive to said reproduced signal for producing a second control signal by utilizing a correlation between reproduced signals delivered from the previously scanned tracks; and
   means responsive to said first and second control signals for deflecting said head means.

2. The scan tracking apparatus as claimed in claim 1, in which said second control signal producing means includes:
   means for extracting the magnitude data of said reproduced signal;
   memory means for storing said magnitude data corresponding to at least one said track;
   means for comparing the magnitude data delivered from said extracting means with the magnitude data stored in said memory means to obtain a comparison result; and
   means responsive to said comparison result for computing said second control signal.

3. The scan tracking apparatus as claimed in claim 1, in which said second control signal producing means includes:
   means for sampling said reproduced signal in synchronism with a horizontal synchronizing signal to deliver magnitude data;
   means responsive to said magnitude data for calculating averaged magnitude data in each of segments, said segments being obtained by dividing the one track;
   memory means for storing said averaged magnitude data corresponding to at least one track;
   means for comparing said averaged magnitude data delivered from said calculating means with said averaged magnitude data stored in said memory means in each of said segments to obtain a comparison result; and
   means responsive to said comparison result for computing said second control signal in each of segments.

* * * * *

UNITED STATES PATENT AND TRADEMARK OFFICE
CERTIFICATE OF CORRECTION

PATENT NO. : 4,520,410
DATED : May 28, 1985
INVENTOR(S) : Toru Sekiguchi, et al.

It is certified that error appears in the above-identified patent and that said Letters Patent is hereby corrected as shown below:

Column 3, line 61, delete "D/A" (first occurrence).

Column 4, line 10, "6" should be --16--;

line 64, insert --$B_{2j}$-- after "signals".

Signed and Sealed this

Twenty-first Day of January 1986

[SEAL]

Attest:

DONALD J. QUIGG

Attesting Officer

Commissioner of Patents and Trademarks